April 17, 1934. J. W. BEIGER 1,955,219
TABLE TOP STRUCTURE
Filed Jan. 3, 1933
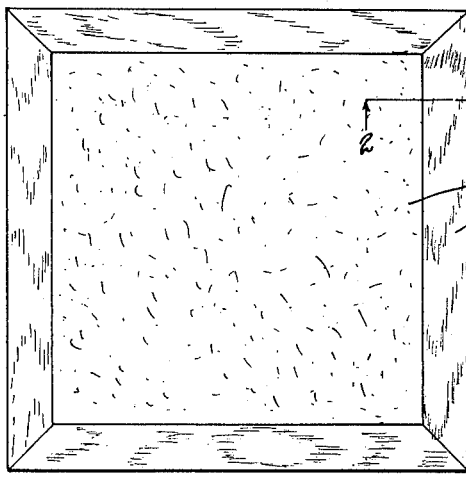
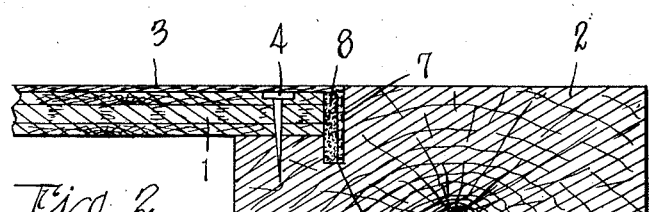
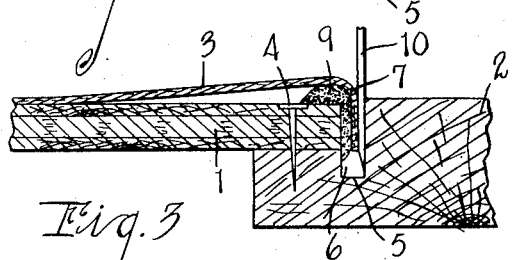
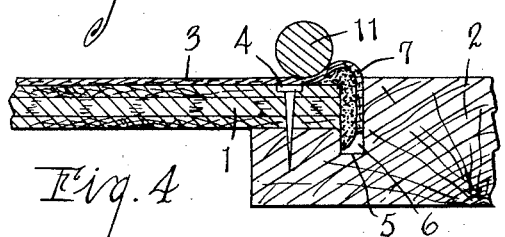
INVENTOR
John W. Beiger
BY
ATTORNEYS Patented Apr. 17, 1934

1,955,219

UNITED STATES PATENT OFFICE 1,955,219

TABLE TOP STRUCTURE

John W. Beiger, Ludington, Mich., assignor to The Carrom Company, Ludington, Mich.

Application January 3, 1933, Serial No. 649,924

5 Claims. (Cl. 45—31)

This invention relates to the invention set forth in my application Serial No. 632,691, filed September 12, 1932, now Patent No. 1,926,079 of Sept. 12, 1933, and to my co-pending applications filed with this application.

The objects of the invention are:

First, to provide a table top with a flexible cover set therein in which the space between the cover and the frame is closed tightly to prevent an accumulation of dust or debris.

Second, to provide such a table top in which plastic material is used to retain the table top cover in place.

Third, to provide a method for making such a table top cover.

Other objects and advantages pertaining to details and economies of construction and operation will appear from the description to follow.

A preferred construction of my invention is illustrated in the accompanying drawing, in which:

Fig. 1 is a plan view of a table top embodying the invention.

Fig. 2 is a detail partial sectional view taken on line 2—2 of Fig. 1.

Fig. 3 is a view similar to Fig. 2 showing one step in the process of placing the flexible covering on the table.

Fig. 4 is a view showing the next step in the process.

The parts will be identified by their numerals of reference which are the same in all the views.

1 is a table top panel which may be of wood, plywood, pressboard, sheet metal, or any desired material. 2 is the frame, preferably having mitered corners, and 3 is a flexible covering of any suitable material such as leather, canvas, leatherette or paper. The top panel 1 is disposed in a rabbet recess on the inner side of the frame and is preferably retained by nails 4, although it may be glued or otherwise secured. When a thin top panel is used, as is here illustrated, a groove 5 is cut at the outer side of the rabbet in the frame to form a recess 6 around the panel and within the frame. If a thick panel is used, there is no need for the recess, it being merely to provide a sufficient clamping surface to hold the flexible cover against the frame. The edge 7 of the flexible cover is tucked within the groove 6, as shown in Fig. 2, and plastic material 8 is forced in to clamp the edge 7 between the plastic material and the outer edge of the groove 6. The material is plastic when it is placed in the groove, but is of such a nature that it hardens to form a permanent clamping means. Putty could be used, or what is commonly known as wood, cement, or plastic wood, which is a mixture of saw dust or fine wood particles and a suitable cement.

The method of fastening the cover 3 is to dispose a sufficient quantity of the plastic material adjacent the edge of the groove 6 to substantially fill the groove. The flexible covering 3 is then placed over the top panel and over the flexible material which is illustrated in Fig. 3 at 9. The edge 7 of the flexible cover is then tucked into the groove 6 around the plastic material. This may be done by a putty knife or by a roller which is common practice in the art. The roller is illustrated at 10. After the edge 7 is tucked into the groove 6, a roller 11 rolls the material 9 into the groove 6 as is shown in Fig. 4, the rolling being done from the center of the table to the outside which forces the plastic material 9 down into the groove to fill it, as is shown in Fig. 2. The plastic material is then allowed to harden and a perfect joint is formed between the frame 2 and the flexible covering 3.

I have shown and described my invention in the embodiment preferred by me, but wish to claim the same broadly as well as specifically, as pointed out in the appended claims.

Having thus described my invention, what I claim as new and desire to secure by Letters Patent is:

1. In a table top structure, a table top frame having a rabbeted groove to receive the top panel, a table top panel having its edges disposed in said groove in spaced relation to said frame forming a groove recess between the edges of the panel and the frame, an extension of said groove formed in said frame, a plastic material joint in said groove recess and said extension, and a flexible top covering over said top panel and plastic material joint and clamped between the plastic material and the frame.

2. In a table top structure, a table top frame having a rabbeted groove to receive the top panel, a table top panel having its edges disposed in said groove in spaced relation to said frame forming a groove recess between the edges of the panel and the frame, a plastic material joint under said covering and in said groove recess, and a flexible top covering over said top panel and plastic material joint and clamped between the plastic material and the frame.

3. In a furniture structure, a frame having a groove therein, a flexible covering the edge of which extends into said groove, and plastic material joint under said covering and in said groove clamping the edge of said covering.

4. The method of manufacturing table top structures comprising providing a table top with a groove, placing plastic material adjacent said groove on said table top, placing a flexible covering over said table top and said plastic material, tucking the edges of said flexible cover in said groove, rolling said plastic material into said groove, whereby said flexible cover is clamped between said plastic material and the edge of said groove, and allowing said plastic material to harden.

5. The method of manufacturing table top structures comprising providing a table top with a groove, placing plastic material adjacent said groove on said table top, placing a flexible covering over said table top and said plastic material, tucking the edges of said flexible cover in said groove, forcing said plastic material into said groove, whereby said flexible cover is clamped between said plastic material and the edge of said groove, and allowing said plastic material to harden.

JOHN W. BEIGER.